(12) United States Patent
Abe (10) Patent No.: US 9,699,368 B2
(45) Date of Patent: Jul. 4, 2017

(54) FOCUS DETECTION APPARATUS AND CONTROL METHOD FOR THE SAME

(71) Applicant: CANON KABUSHIKI KAISHA, Tokyo (JP)

(72) Inventor: Hiroshi Abe, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/945,868

(22) Filed: Nov. 19, 2015

(65) Prior Publication Data
US 2016/0150150 A1 May 26, 2016

(30) Foreign Application Priority Data
Nov. 21, 2014 (JP) .................................. 2014-237021

(51) Int. Cl.
| | |
|---|---|
| *H04N 5/232* | (2006.01) |
| *H04N 17/00* | (2006.01) |
| *H04N 5/235* | (2006.01) |
| *G02B 7/34* | (2006.01) |
| *G03B 19/12* | (2006.01) |
| *G02B 7/09* | (2006.01) |

(52) U.S. Cl.
CPC ........... *H04N 5/23212* (2013.01); *G02B 7/34* (2013.01); *H04N 5/2356* (2013.01); *H04N 5/23216* (2013.01); *H04N 5/23245* (2013.01); *H04N 17/002* (2013.01); *G02B 7/09* (2013.01); *G03B 19/12* (2013.01)

(58) Field of Classification Search
CPC ............. H04N 5/23212; H04N 5/2356; G03B 13/32–13/36; G03B 3/00–3/12; G02B 7/28–7/40
See application file for complete search history.

(56) References Cited

U.S. PATENT DOCUMENTS

| | | | |
|---|---|---|---|
| 2016/0150166 A1* | 5/2016 | Hashimoto | ........ H04N 5/23212 348/241 |
| 2016/0173758 A1* | 6/2016 | Kai | .................... H04N 5/23245 348/345 |

FOREIGN PATENT DOCUMENTS

| | | |
|---|---|---|
| JP | 2005-109621 A | 4/2005 |
| JP | 2005-227639 A | 8/2005 |

\* cited by examiner

*Primary Examiner* — Paul Berardesca
(74) *Attorney, Agent, or Firm* — Cowan, Liebowitz & Latman, P.C.

(57) ABSTRACT

A focus detection unit detects a defocus value, and a correction value for shifting an in-focus position based on the defocus value is obtained by a first method or by a second method. The correction value obtained by the second method is converted to a correction value of the first method by changing units, and the correction value obtained by the first method or the converted correction value is stored in a storage unit. A control unit controls driving of a focus lens to a lens position based on a value obtained by correcting the defocus value by the stored correction value. In the second method, a user selects one of a plurality of images obtained by driving the focus lens, and the correction value is calculated based on the defocus value of the selected image.

9 Claims, 5 Drawing Sheets

FOCUS DETECTION APPARATUS AND CONTROL METHOD FOR THE SAME

BACKGROUND OF THE INVENTION

Field of the Invention

The present invention relates to a focus detection apparatus and a control method for the same, and in particular relates to a focus detection apparatus capable of performing automatic focus adjustment, and a control method for the same.

Description of the Related Art

Single-lens reflex cameras are often provided with a focus detection system that uses a phase difference detection method to detect the focus state (defocus value) of the imaging optical system based on the phase difference between a pair of images formed by light that passed through the imaging optical system in an interchangeable lens. In this phase difference detection method, there is a risk of not being able to accurately detect the in-focus position due to the influence of the environment or the like at the time of imaging, and due to manufacturing error in single-lens reflex cameras and interchangeable lenses.

In order to solve this problem, Japanese Patent Laid-Open No. 2005-227639 discloses an image capturing apparatus that has a function (AF micro adjustment) for allowing the user to make desired micro adjustments to a correction value for the automatic focus adjustment function (AF).

Further, Japanese Patent Laid-Open No. 2005-109621 discloses an image capturing apparatus that has a function in which the defocus value of the imaging lens is associated with images, and an AF correction value is automatically calculated based on a focus position shift amount associated with an image determined by the user to be in focus.

However, the conventional technology disclosed in Japanese Patent Laid-Open No. 2005-227639 has an issue in that the operations of image capturing and checking need to be performed repeatedly in order to check whether or not the result of the user's micro adjustment is correct.

Further, a correction value by the AF micro adjustment disclosed in Japanese Patent Laid-Open No. 2005-227639 shows a different value from a defocus value in Japanese Patent Laid-Open No. 2005-109621, and therefore, these two functions cannot be mutually used.

SUMMARY OF THE INVENTION

The present invention has been made in consideration of the above situation, and enhances convenience of an auto focus adjustment function in an image capturing apparatus that is capable of obtaining an adjustment value for auto focus adjustment function using different methods.

According to the present invention, provided is a focus detection apparatus comprising: a focus detection unit configured to detect a defocus value; a first calculation unit configured to obtain a correction value for shifting an in-focus position based on the defocus value by a first method; a second calculation unit configured to obtain a correction value for shifting the in-focus position based on the defocus value by a second method that is different from the first method; a conversion unit configured to convert the correction value obtained by the second method to a correction value of the first method by changing units; a storage unit configured to store the correction value obtained by the first calculation unit or the correction value converted by the conversion unit; and a control unit configured to control driving of a focus lens to a lens position based on a value obtained by correcting the defocus value by the correction value stored in the storage unit, wherein, in the second method, at least one of a plurality of images obtained by driving the focus lens to a plurality of different lens position is selected by a user, and the correction value is calculated based on the defocus value corresponding to the selected image.

Further, according to the present invention, provided is a control method for a focus detection apparatus comprising: detecting a defocus value; obtaining a correction value for shifting an in-focus position based on the defocus value by a first method or by a second method that is different from the first method; converting, in a case where the correction value is obtained by the second method, the obtained correction value to a correction value of the first method by changing units; storing the correction value obtained by the first method or the correction value converted in the converting step in a storage unit; and controlling driving of a focus lens to a lens position based on a value obtained by correcting the defocus value by the correction value stored in the storage unit, wherein, in the second method, at least one of a plurality of images obtained by driving the focus lens to a plurality of different lens position is selected by a user, and the correction value is calculated based on the defocus value corresponding to the selected image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1:
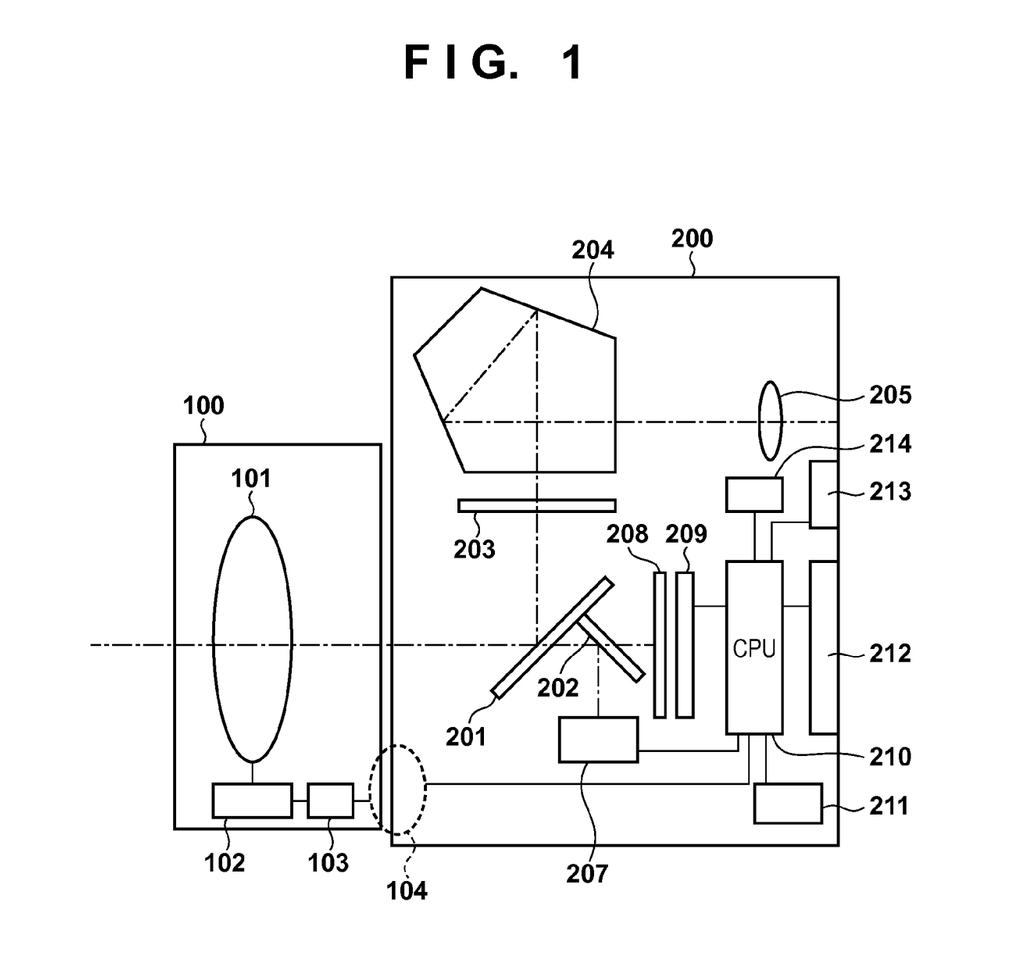
FIG. 1 is a block diagram showing a schematic configuration of an image capturing apparatus according to an embodiment of the present invention.

Hereinafter, a first embodiment of the present invention will be described. FIG. 1 is a block diagram showing the schematic configuration of an image capturing apparatus according to the first embodiment. As shown in FIG. 1, an imaging lens 100 is removably attached to an image capturing apparatus 200 via a lens mounting mechanism of a mount unit (not shown). The mount unit is provided with an electrical contact unit 104. The image capturing apparatus 200 performs communication with the imaging lens 100 via the electrical contact unit 104, and controls a focus lens 101 in the imaging lens 100. Note that although FIG. 1 shows only the focus lens 101 as a lens in the imaging lens 100, various other lenses such as a zoom lens and a fixed lens are normally provided as well.

Light flux from a subject (not shown) is guided to a main mirror 201 in the image capturing apparatus 200 via the focus lens 101 in the imaging lens 100. The main mirror 201 is arranged with an inclination relative to the optical axis in the imaging light path, and can move to a first position (the illustrated position) for guiding light flux from the subject to a viewfinder optical system thereabove, and a second position of being retracted outside the imaging light path. Also, the central portion of the main mirror 201 is a half-mirror, and a portion of the light flux from the subject passes through the half-mirror portion when the main mirror 201 is mirrored-down to the first position. This transmitted light flux is reflected by a sub mirror 202 provided on the rear surface side of the main mirror 201, and is guided to a focus detection unit 207.

Meanwhile, the light flux reflected by the main mirror 201 forms an image on a focus plate 203 arranged at a position that is optically conjugate with an image sensor 209. This light flux is diffused by the focus plate 203, and the light that passes through the focus plate 203 (subject image) is converted into an erected image by a roof pentaprism 204. The erected image is enlarged by an eyepiece 205, and the resulting image can be observed by the user.

Also, when the main mirror 201 is mirrored-up to the second position, the sub mirror 202 is also folded along with the main mirror 201 so as to be retracted outside the imaging light path. Accordingly, the light flux from the imaging lens 100 passes through a focal plane shutter 208, which is a mechanical shutter, and arrives at the image sensor 209. The focal plane shutter 208 limits the amount of light that is incident on the image sensor 209. The image sensor 209 is configured to include, for example, a photoelectric conversion element, such as a CCD sensor or a CMOS sensor, that performs photoelectric conversion on the subject image formed by the imaging lens 100 and outputs the resulting electrical signal.

Also, 210 denotes a camera CPU, which is a controller that controls various types of calculations and various types of operations in the camera. The CPU 210 performs overall control of the image capturing apparatus 200, and controls the operation of various circuits and the like that will be described later. The CPU 210 performs communication with a lens control circuit 103 in the imaging lens 100 via the electrical contact unit 104. In accordance with a control signal from the CPU 210, the lens control circuit 103 controls a lens driving mechanism 102 that performs focus adjustment by driving the focus lens 101 in the optical axis direction. The lens driving mechanism 102 has a stepping motor as a driving source.

An EEPROM 211 is also connected to the CPU 210. The EEPROM 211 stores parameters that need to be adjusted when controlling the image capturing apparatus 200, and camera ID (identification) information, which is unique information for individually identifying the image capturing apparatus 200. It also stores adjustment values for parameters related to imaging, which are adjusted using a reference lens (an imaging lens used during adjustment at the image capturing apparatus factory), for example.

A display unit 212 is an apparatus for displaying image data of images captured by the image sensor 209 and displaying items set by the user, and is generally configured by a color liquid crystal display element.

Furthermore, a counter 214 and an operation detection unit 213 that detects operations performed by the user on the image capturing apparatus 200 are connected to the CPU 210. Specifically, the operation detection unit 213 detects an operation performed on a release button (not shown), a select button, and a button allowing the selection of one image from among images obtained by later-described bracket imaging. The counter 214 is a counter for counting the number of shots when performing bracket imaging. The counter value of the counter 214 is reset by the CPU 210.

Meanwhile, the lens control circuit 103 of the imaging lens 100 is provided with a memory (not shown) that stores property information such as the full-open aperture value and the focal length of the imaging lens 100, and lens ID (identification) information, which is unique information for identifying the imaging lens 100. The memory also stores information received by communication from the CPU 210. Note that the property information and the lens ID information are transmitted to the CPU 210 by initial communication at the time of mounting to the image capturing apparatus 200, and the CPU 210 stores this information in the EEPROM 211.

Figure 2:
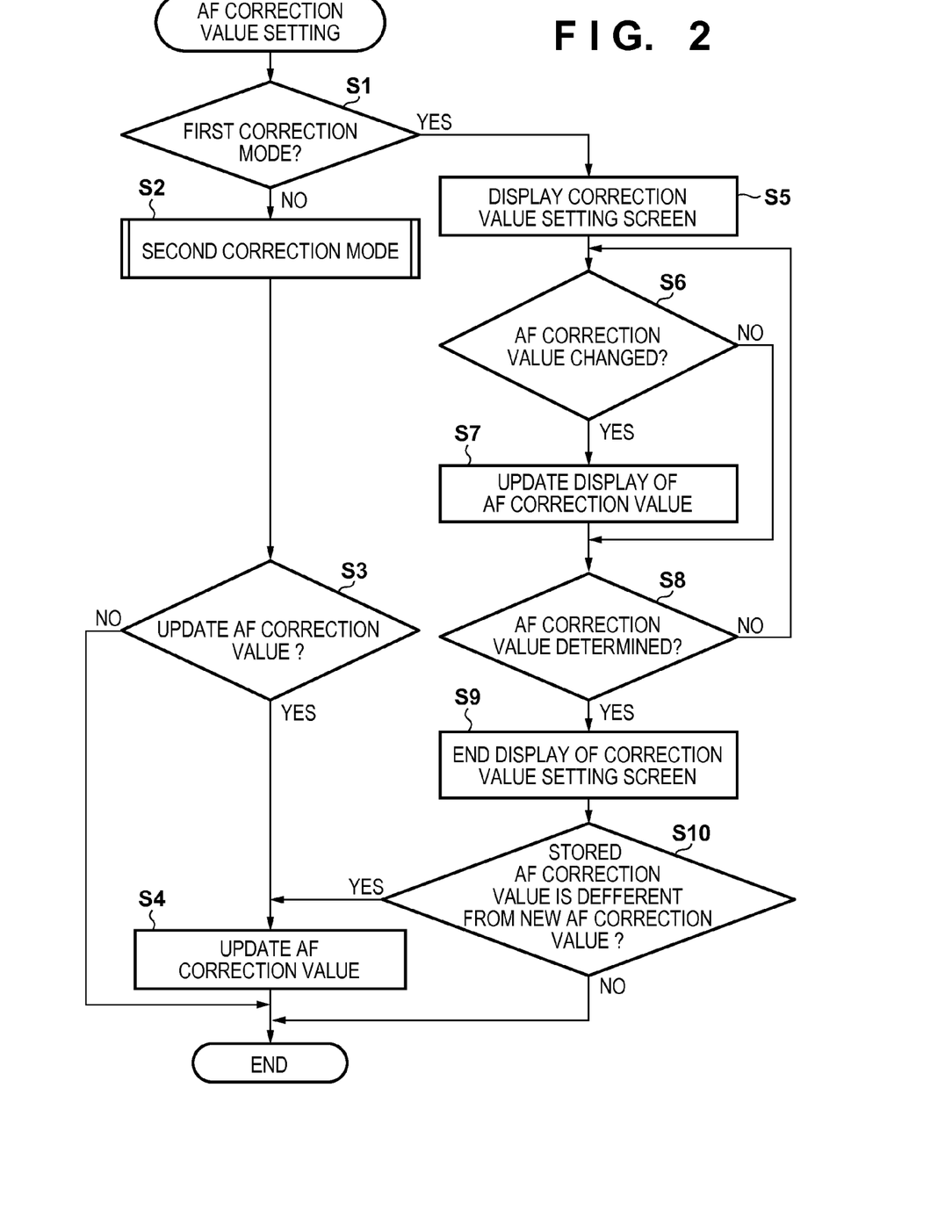
FIG. 2 is a flowchart showing AF correction value setting processing according to an embodiment.

FIG. 2 is a flowchart showing AF correction value setting processing according to the present embodiment. In the present embodiment, it is possible to select either a first correction mode in which the user performs AF micro adjustment for setting a desired AF correction value or a second correction mode in which the AF correction value is obtained using micro adjustment support (MAS). Note that details of AF micro adjustment and the processing using MAS will be described later.

Figure 3:
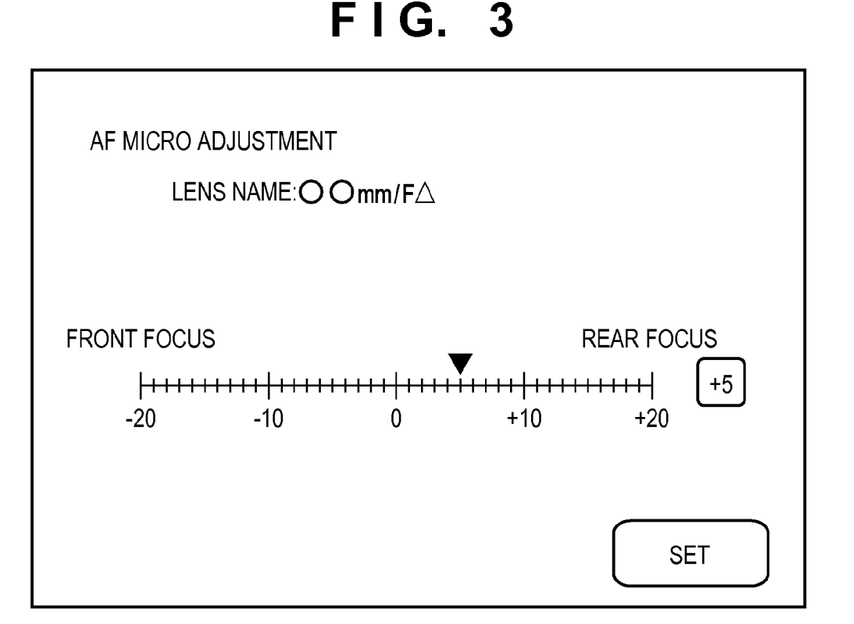
FIG. 3 is a diagram showing an example of a correction value setting screen used in AF micro adjustment according to an embodiment.

First, in step S1, it is determined whether or not the first correction mode was selected. If the first correction mode has been selected, the procedure moves to step S5, and if the first correction mode has not been selected, the procedure moves to step S2. In step S5, a correction value setting screen for performing AF micro adjustment is displayed on the display unit 212. FIG. 3 is a diagram showing an example of the correction value setting screen.

AF micro adjustment is processing in which the user determines, based on a captured image, the amount and direction of shift between the actual in-focus position and the in-focus position that is based on the defocus value detected by the focus detection unit 207, and the user directly sets the AF correction value. As shown in FIG. 3, with AF micro adjustment in the present embodiment, the user can set the AF correction value to a desired value in increments of one tick mark in the range of ±20 tick marks, and the in-focus position that is based on the defocus value can be shifted by an amount corresponding to the AF correction value that was set. The amount of focus correction on the AF correction value for each tick mark is assumed to be $(1/16) \times F\delta$ (F: aperture F of imaging lens, $\delta$: diameter of permissible circle of confusion) in the present embodiment, but there is no limitation to this in the present invention, and this focus correction amount per tick mark can be changed as necessary according to the properties of the imaging lens 100 and the image capturing apparatus 200. In FIG. 3, 0 is the reference position set as a factory default in the image capturing apparatus 200. In the correction value setting screen shown in FIG. 3, the black triangle pointer indicates the AF correction value stored in the EEPROM 211, and the user can change the AF correction value by performing an operation for moving the black triangle pointer along the scale. When the correction value setting screen is displayed, the procedure moves to step S6.

In step S6, it is determined whether or not an operation for changing the AF correction value was performed by the user using the correction value setting screen. If an operation for changing the AF correction value was performed, the procedure moves to step S7, and if an operation for changing the AF correction value has not been performed, the procedure moves to step S8.

In step S7, the display of the correction value setting screen is updated in accordance with the user operation. Here, in the correction value setting screen shown in FIG. 3, the black triangle pointer is displayed at a position that corresponds to the user operation.

In step S8, it is determined whether or not the user determined an AF correction value. Here, it is determined whether or not a "set" button was selected in the correction value setting screen shown in FIG. 3. If the "set" button was not selected, the procedure returns to step S6, and the above processing is repeated. However, if the "set" button was selected, and an AF correction value is determined, the procedure moves to step S9, in which the display of the correction value setting screen is ended, and then the procedure moves to step S10.

In step S10, it is determined whether or not the AF correction value that was stored in the EEPROM 211 when the first correction mode was selected is different from the new AF correction value that was set by the processing from step S6 to step S8. If these two values are different, the procedure moves to step S4, the AF correction value is updated, and if the value has not been changed, AF correction value setting processing is ended.

Figure 4:
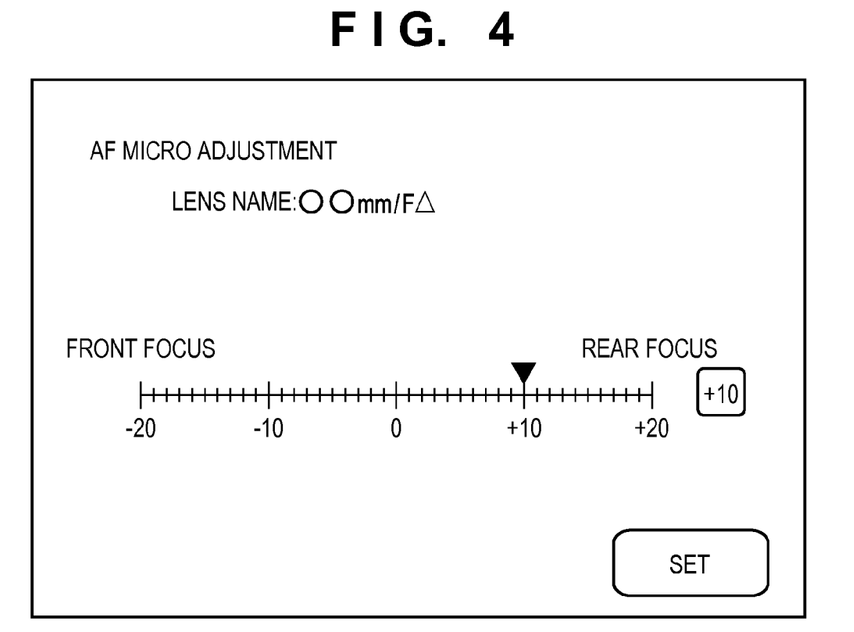
FIG. 4 is a diagram showing a screen on which an AF correction value using MAS is displayed.

FIG. 4 is a diagram showing a screen of the display unit 212 on which a stored AF correction value is shown. The tick marks are commonly used for the AF micro adjustment function in the first correction mode and for MAS in the second correction mode. The user can change the AF correction value set by using MAS by using the AF micro adjustment function.

On the other hand, if the first correction mode has not been selected in step S1, an AF correction value is calculated using MAS in the second correction mode in step S2. In the second correction mode that uses MAS, multiple images are captured while driving the position of the focus lens 101 a very small amount, the image determined by the user to be the most in-focus is selected from among the obtained images, and an AF correction value is obtained based on the defocus value of the selected image. Note that details of the processing performed in step S2 will be described later. When the AF correction value has been calculated, the procedure moves to step S3.

In step S3, it is determined whether or not the AF correction value stored in the EEPROM 211 is to be updated to the AF correction value that was calculated in step S2. Here, in the case where the AF correction value is to be updated, such as the case where the setting of the calculated AF correction value was selected by a predetermined operation, the procedure moves to step S4, whereas in the case where the AF correction value is not to be updated, such as the case where AF correction value setting processing was canceled by a predetermined operation, AF correction value setting processing is ended.

In step S4, in which the AF correction value is updated by storing the AF correction value that was obtained by the processing of step S2 or the processing from step S6 to step S10 in the EEPROM 211, and when this updating ends, AF correction value setting processing is ended.

As described above, the AF correction value stored in the EEPROM 211 is used to correct the lens drive amount during AF that is based on the defocus value detected by the focus detection unit 207 (focus detection result), using Equation (1) below.

$$\text{lens drive amount} = \text{defocus value} + \text{adjustment value} + \text{AF correction value} \quad (1)$$

Note that in Equation (1), the adjustment value indicates data for adjusting the defocus value set at the time of manufacturing.

Figure 5A:
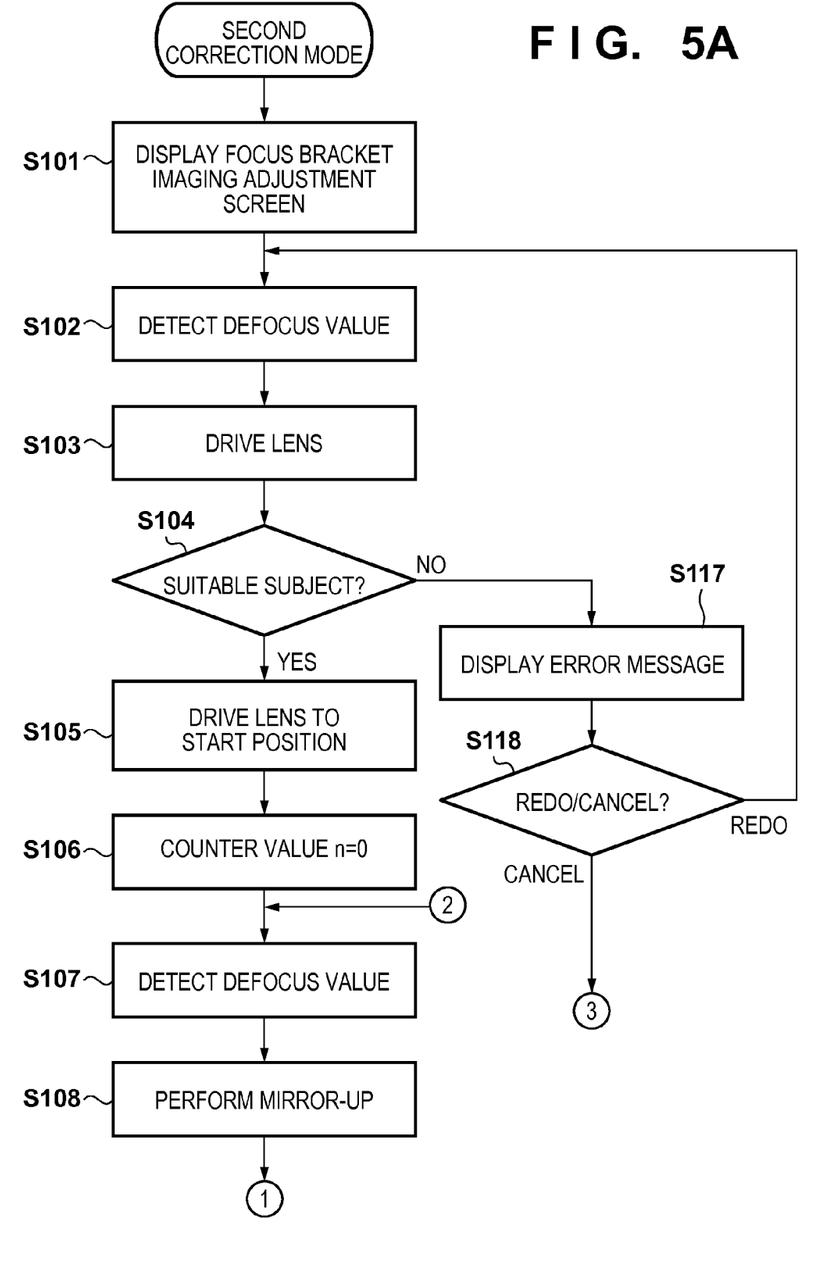
FIGS. 5A and 5B are flowcharts showing correction value setting processing that uses MAS according to an embodiment.
Figure 5B:
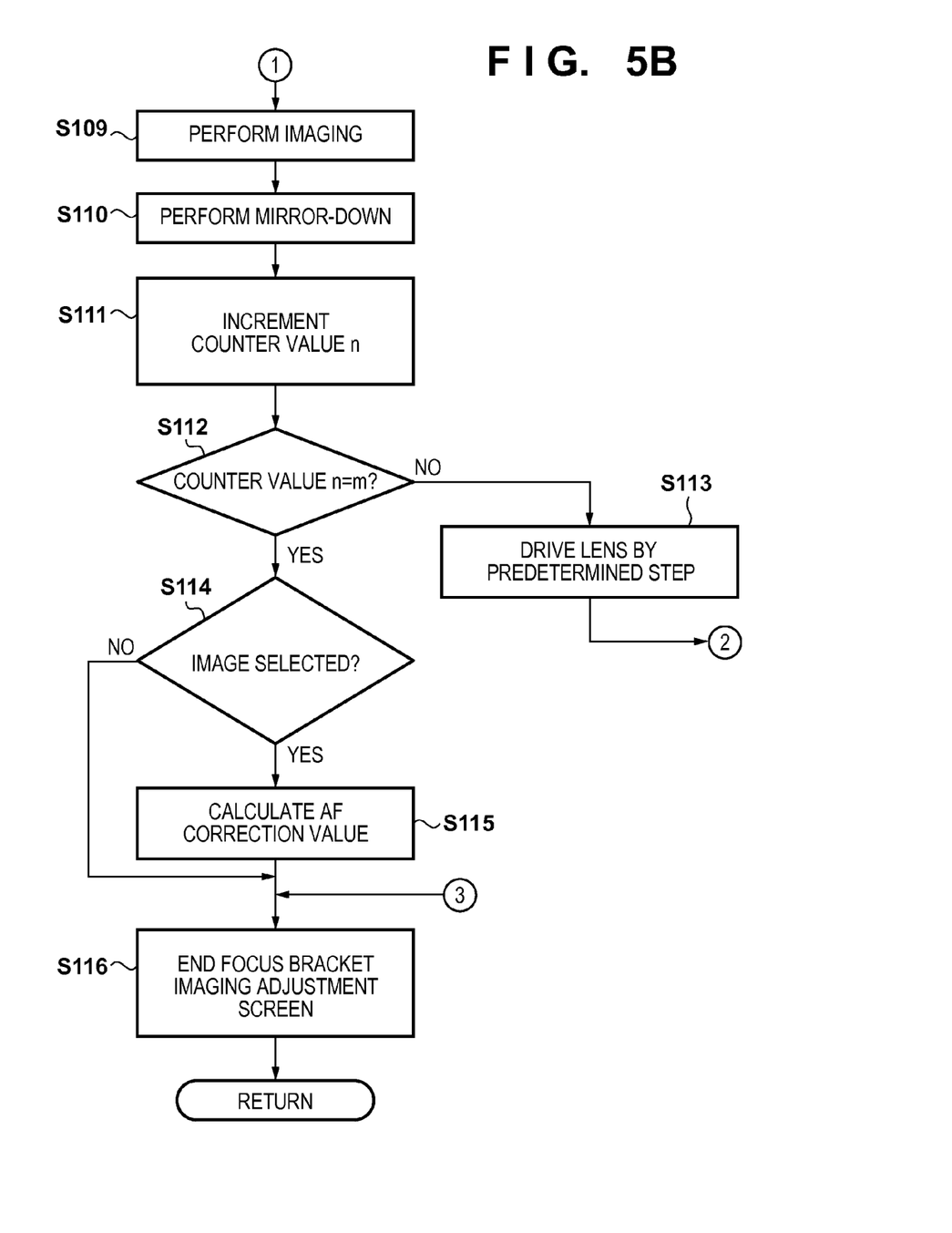

Next, the processing performed in step S2 to set the AF correction value using MAS in the second correction mode will be described with reference to the flowchart in FIGS. 5A and 5B.

First, in step S101, a focus bracket imaging adjustment screen is displayed on the display unit 212. The content displayed here is, for example, an operation instruction for the user. When the adjustment screen has been displayed, the procedure moves to step S102. In step S102, the focus detection unit 207 detects the defocus value for the subject that is to be used in the calculation of the AF correction value of the imaging lens 100. When the detection of the defocus value ends, the procedure moves to step S103, in which the focus lens 101 is driven to a lens position that corresponds to the defocus value that was detected (in-focus position). When the driving of the focus lens 101 ends, the procedure moves to step S104.

In step S104, it is determined whether or not the subject used in the detection of the defocus value in step S102 is a subject that is suited to the calculation of the AF correction value. Here, for example, the focus detection unit 207 calculates an AF reliability evaluation value for the subject based on a signal received by a focus detection sensor (not shown) that is provided in the focus detection unit 207. This is performed because the focus detection precision of the focus detection unit 207 decreases if the subject is dark or has low contrast, and therefore the AF reliability evaluation value is given a low value in a case where the focus detection precision may decrease. Then, it is determined whether or not the subject is suitable based on the AF reliability evaluation value that was obtained. If the subject is suitable, the procedure moves to step S105, and if the subject is not suitable, the procedure moves to step S117.

If the subject was not suitable, in step S117, an error message (indicating the fact that an error occurred and the probable cause of the error) is displayed on the display unit 212. When the display is complete, the procedure moves to step S118, in which an instruction to redo or cancel adjustment is received from the user. In the case of redoing adjustment, the procedure returns to step S102, and in the case of canceling adjustment, the procedure moves to step S116 in FIG. 5B.

In step S105, the lens is driven to the focus bracket start position. Letting s be the lens driving step each time imaging is performed, and m be the number of shots, the focus bracket start position is on the close end side at a position $(m-1) \times s/2$ away from the in-focus position that was calculated based on the defocus value. In step S106, a counter value n of the counter 214 is reset. This counter value n is associated with the number of focus bracket shots, and is set to 0 before the start of focus bracket imaging, and thereafter the procedure moves to step S107.

In step S107, the focus detection unit 207 performs defocus value detection. The defocus value detected here is ultimately stored in association with the image that is captured in step S109. When the detection of the defocus value ends, the procedure moves to step S108.

In step S108, prior to imaging in step S109, mirror-up is performed such that the main mirror 201 and the sub mirror 202 move to the second position so as to be retracted outside the imaging light path. When mirror-up ends, the procedure moves to step S109 in FIG. 5B. In step S109, imaging is performed, and the obtained image is stored in association with the defocus value that was detected in step S107. When imaging ends, the procedure moves to step S110, in which mirror-down is performed such that the main mirror 201 and the sub mirror 202 move to the first position in the above-described imaging light path. When mirror-down ends, the procedure moves to step S111.

In step S111, the counter value n that indicates the number of shots is incremented, and then the procedure moves to step S112. In step S112, it is determined whether or not the value of the counter value n has reached the number of shots m. If the counter value n has not reached the number of shots m, the procedure moves to step S113, and if it has reached the number of shots m, the procedure moves to step S114. In step S113, the focus lens 101 is driven toward infinity by the lens driving step s, and when lens driving ends, the procedure moves to step S107. By repeating the processing from step S107 to step S113, m images having different focus states by the lens driving step s are captured consecutively. Note that the above-described example describes the case of first driving the focus lens 101 to the close end side and then performing focus bracket imaging while driving the focus lens toward infinity, but a configuration is possible in which the focus lens is first driven to the infinity side and then focus bracket imaging is performed while driving the focus lens toward the close end.

In step S114, the user selects one best-focused image in which the focus appears to be the most appropriate, from among the m images having different focus states by the lens driving step s.

At this time, the images obtained by the focus bracket imaging are displayed on the display unit 212. The images for display may be displayed one at a time, or may be displayed side-by-side. At this time, the displayed images may be images that have undergone image processing that is different from normal image processing in order to make the focus state easier to perceive. For example, processing for enhancing edges is performed to improve the visual quality when displaying normal captured images, but it is possible to omit edge enhancement processing in the image display performed in step S114. The user operates an operation member (not shown) while checking the images displayed on the display unit 212, selects the image having the best in-focus state, and then determines the selection. If it is difficult to identify which image is in the in-focus state among the images, the user may be allowed to select multiple images. For example, if the user has determined that the in-focus state is between two images that were obtained by focus bracket imaging, it is possible to select two images.

Also, it is not necessarily required to select an image in step S114, and if, for example, the selection of the best-focused image is difficult, and an image has not been selected for a predetermined time, AF correction value setting processing has been canceled by a predetermined operation, or the like, the procedure moves to step S116. On the other hand, if one best-focused image has been selected, the procedure moves to step S115.

In step S115, the defocus value that is associated with the image that was selected by the user in step S114 is converted to the AF correction value in the AF micro adjustment in the first correction mode by changing the units. Note that, in a case where a plurality of images are selected in step S114, the average of the defocus values that are associated with the selected images is converted to the AF correction value. Here, by dividing the defocus value that is associated with the image by $(1/16)*F\delta$, which corresponds to one tick mark in FIG. 3, it is possible to convert the unit of the defocus value to the unit used in the AF micro adjustment and calculate the AF correction value. When the calculation of the AF correction value is complete, the procedure moves to step S116. In step S116, the display of the focus bracket imaging adjustment screen is ended, and the calculation of the correction value in the second correction mode ends.

Note that the above example description is given assuming that MAS is used in the second correction mode, the user chooses one image from a group of images for AF correction value calculation that were obtained by focus bracket imaging, and the AF correction value is calculated based on the defocus value that is associated with the chosen image. However, the present invention is not limited to this, and a configuration is possible in which focus bracket imaging is not performed in order to calculate the AF correction value. For example, a configuration is possible in which multiple images that are associated with defocus values and are not consecutive in time are used as AF correction value calculation images, the user chooses one image from among them, and the AF correction value is calculated based on the defocus value that is associated with the chosen image.

According to the present invention as described above, it is possible to handle an AF correction value determined by the AF micro adjustment and an AF correction value determined using MAS in the same unit, and it becomes easy to change an AF correction value determined using MAS by the AF micro adjustment. By virtue of this, it is possible to provide a high precise and convenient auto focus adjustment function.

Note that the above-described example describes, in the second correction mode, the case of first driving the focus lens 101 to the close end side and then performing focus bracket imaging while driving the focus lens toward infinity, but a configuration is possible in which the focus lens is first driven to the infinity side and then focus bracket imaging is performed while driving the focus lens toward the close end.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-237021, filed on Nov. 21, 2014 which is hereby incorporated by reference herein in its entirety.

What is claimed is:

1. A focus detection apparatus comprising at least one processor or one circuitry which functions as:
   a focus detection unit that detects a defocus value;
   a first calculation unit that obtains a correction value for shifting an in-focus position by a first method, the in-focus position being based on the defocus value;
   a second calculation unit that obtains a correction value for shifting the in-focus position by a second method that is different from the first method, the in-focus position being based on the defocus value;
   a conversion unit that converts the correction value obtained by the second method to a correction value of the first method by changing units;
   a storage unit that stores the correction value obtained by the first calculation unit or the correction value converted by the conversion unit; and
   a control unit that controls driving of a focus lens to a lens position based an a value obtained by correcting the defocus value by the correction value stored in the storage unit,
   wherein, in the second method, at least one of a plurality of images obtained by driving the focus lens to a plurality of different lens position is selected by a user, and the correction value is calculated based on the defocus value corresponding to the selected image.

2. The focus detection apparatus according to claim 1, wherein the processor or circuitry further functions as a selection unit that selects the first calculation unit or the second calculation unit,
   wherein the storage unit stores the correction value obtained by the first calculation unit or the correction value converted by the conversion unit in accordance with a selection by the selection unit.

3. The focus detection apparatus according to claim 1, wherein, in the second method, imaging is performed at respective lens positions of the focus lens while driving the focus lens by a predetermined driving step within a range predetermined on the basis of the in-focus position.

4. The focus detection apparatus according to claim 1, wherein, in the second method, each image is stored in association with a defocus value, at least one of the plurality of stored images is selected by the user, and the correction value is calculated based on the defocus value of the selected image.

5. The focus detection apparatus according to claim 1, wherein, in the first method, a shift amount of the focus lens to be shifted from the in-focus position is set by the user, and the on value is calculated based on the set shift amount.

6. The focus detection apparatus according to claim 5, further comprising a display that displays a setting screen for the user to set the shift amount of the focus lens,
   wherein the correction value stored in the storage unit is displayed on the setting screen.

7. The focus detection apparatus according to claim 1, wherein, when a full-open F number of an imaging lens is F, a diameter of a permissible circle of confusion is δ, then a unit of the correction value in the first method is $(1/16)*F\delta$.

8. A control method for a focus detection apparatus comprising:
   detecting a defocus value;
   obtaining a correction value for shifting an in-focus position by a first method or by a second method that is different from the first method, the in-focus position being based on the defocus value;
   converting, in a case where the correction value is obtained by the second method, the obtained correction value to a correction value of the first method by changing units;
   storing the correction value obtained by the first method or the correction value converted in the converting step in a storage unit; and
   controlling driving of a focus lens to a lens position based on a value obtained by correcting the defocus value by the correction value stored in the storage unit,
   wherein, in the second method, at least one of a plurality of images obtained by driving the focus lens to a plurality of different lexis position is selected by a user, and the correction value is calculated based on the defocus value corresponding to the elected image.

9. A non-statutory computer-readable storage medium storing a program for causing a computer included in an image capturing apparatus to execute the steps of a control method that comprises:
   detecting a defocus value;
   obtaining a correction value for shifting an in-focus position by a first method or by a second method that is different from the first method, the in-focus position being based on the defocus value;
   converting, in a case where the correction value is obtained by the second method, the obtained correction value to a correction value of the first method by changing units;
   storing the correction value obtained by the first method or the correction value converted in the converting step in a storage unit; and
   controlling driving of a focus lens to a lens position based on a value obtained by correcting the defocus value by the correction value stored in the storage unit,
   wherein, in the second method, at least one of a plurality of images obtained by driving the focus lens to a plurality of different lens position is selected by a user, and the correction value is calculated based on the defocus value corresponding to the selected image.

* * * * *